Dec. 6, 1955     T. W. MULLEN     2,725,664
BAIT FEEDER AGITATOR
Filed Aug. 3, 1954
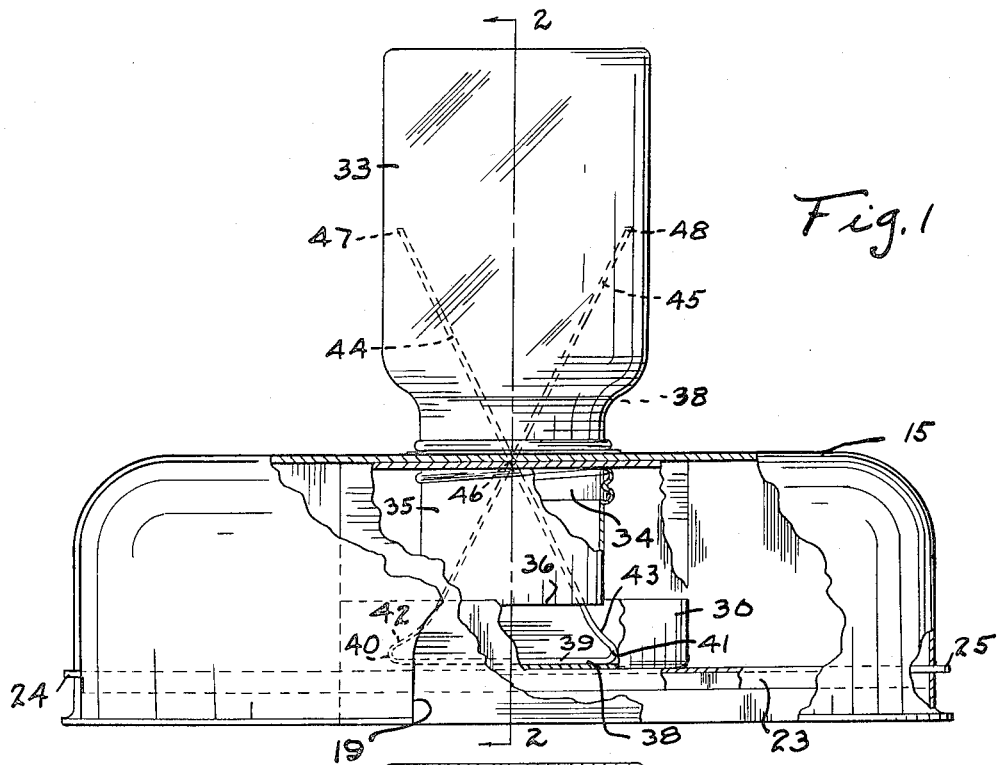
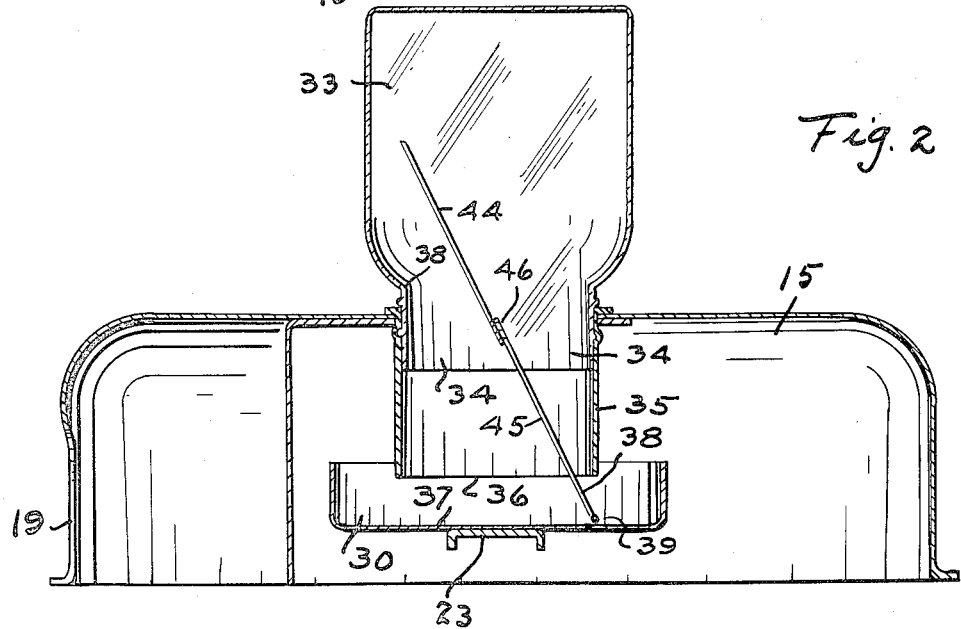
INVENTOR,
THOMAS W. MULLEN
By Herbert A. Minturn,
ATTORNEY.

United States Patent Office 2,725,664
Patented Dec. 6, 1955

2,725,664

BAIT FEEDER AGITATOR

Thomas W. Mullen, Evansvile, Ind.

Original application February 2, 1952, Serial No. 269,635, now Patent No. 2,690,028, dated September 28, 1954. Divided and this application August 3, 1954, Serial No. 447,492

4 Claims. (Cl. 43—131)

This application is a division from my application for U. S. Letters Patent Serial No. 269,635, filed February 2, 1952, and allowed February 5, 1954.

This invention applies to feeding devices wherein there is a receptacle open at one end to have that end turned downwardly over a feed receiving pan, to allow the feed to run out of the lower end of the receptacle and be available within the pan around the perimeter of the end of the receptacle. In the present instance, the receptacle may carry a dry ground cereal in which is incorporated a rat or mouse poison or a chemical such as 3-(alpha-acetonylbenzyl)-4-hydroxycoumarin, which chemical has that property of producing or rather inducing hemorrhaging within the rodent eating the chemical, the hemorrhaging effect building up over a period of days through continued eating of the mixture of the chemical and the cereal.

In any event, the dry rather finely ground cereal tends to bridge over in the container so that after the material which has dropped to the pan initially is eaten, the bridging effect will prevent the cereal from dropping on down to replenish that feed in the pan.

My invention has to do with a device insertable through the end of the container and resting on the floor of the pan whereby the device will be agitated or moved about should there be a bridging effect within the container, so that this device will stir up or agitate the feed within the container and cause it to drop down. The device is actuated by the rodent attempting to secure more feed than is available in the outermost portions of the pan at least.

A primary object of the invention is first to provide an agitating device which will actually break up the bridging effect, and secondly which will be exceedingly light in nature and readily operated by the rodent in attempting to get more feed from the pan. Also there is the important object of having the device made in the smallest possible form so as to be accepted as to its presence by the rodent without being scared away thereby. Also the device may be made at a relatively low cost and may be inserted within and removed from the container with the minimum amount of effort and without the use of any tools whatsoever.

These and many other objects and advantages of the invention will become apparent in the following description of one particular form thereof which is made in conjunction with the accompanying drawing, in which—

Fig. 1 is a view in side elevation and partial section of a structure embodying the invention; and Fig. 2 is a view in central vertical section on the line 2—2 in Fig. 1.

In the particular form shown herein, to which form my invention is applied in the present instance, there is an inverted housing 15 open from the under side, and is provided with at least one entry opening 19. There is a cross bar 23 carried diametrically across the lower portion of the housing and supported by the side wall of the housing such as by inserting tongue-like ends 24 and 25 through the wall. On this cross bar 23 there is fixed a pan 30.

A feed or bait receptacle 33 herein shown as being a glass jar of the "Mason jar" type is inserted with its end 34 downwardly through the top of the housing 15. In the form herein shown, the jar is screw-threadedly received within a tube 35 which extends downwardly to within the pan 30, but has its lower end 36 spaced upwardly from the floor 37 of the pan 30.

In practice, the jar or container 33 is removed from the engagement with the housing 15 and the tube 35 and the feed or bait material is placed therein and then the housing is placed thereover and screw-threadedly engaged with the jar, and then the entire assembly is turned over to have the open end 34 turned downwardly to allow the feed to drop downwardly into the pan 30. That is the normal procedure and operation of the feeder or bait dispenser.

Particularly in the use of such containers where there is the offset shoulder 38, the feed will tend to bridge across the container at that level and thus prevent further dropping down of the feed into the pan 30. The device embodying my invention consists simply of a single length of wire 38 which has a lower straight length 39 designed to rest on the floor 37, and to have a length exceeding the diameter of the tube 35, at least the diameter of the open end 36. From each end of the base length 39, the wire turns around and inwardly by the respective loops 40 and 41 to have those lengths return a short distance through a curve 42 and 43 respectively over the length 39, and then from these bends 42 and 43, the wires extend diagonally upwardly one across the other as indicated in Fig. 1. The line of intersection of these two lengths designated by the numerals 44 and 45 cross at an intersecting zone 46 located within the mouth of the receptacle 33 adjacent the lower end 34. The spacing apart of the two wires 44 and 45 by their ends 47 and 48 is made to be greater than the diameter of the mouth 34 of the receptacle 33 and also of the tube 35.

Thus in order to be able to insert these wires 44 and 45 into the receptacle 33, they are squeezed together and pushed upwardly through the tube 35 and the mouth 34 and then allowed to spring apart. The positioning of the ends 47 and 48 are such that the distance therebetween is a little less than the internal diameter of the receptacle 33 so that they do not rest under a bending stress.

The device thus formed will rest in an inclined position as illustrated in Fig. 2 where the base wire 39 will be located somewhat outwardly beyond the perimeter of the lower end 36 of the tube 35. When the rodent is working around with its mouth in the pan 30 trying to reach more feed under the tube 35, it will necessarily have to push the base wire 39 around, and particularly will come into contact with the loops 40 and 41 with the result that the wire will be pushed and moved about so that the upper end portions criss-crossing through the lower end of the container 33 and diagonally extending through the tube 35 as well as within the portion of the container 33 above the shoulders 38 will break loose any bridging effect and cause the feed to drop downwardly freely through the tube 35. As above indicated, the wire will be of sufficient elasticity to permit the ends 47 and 48 to be sprung together for admission into the container 33 and also for withdrawing therefrom by simply pulling on the base wire 39.

Therefore it is to be seen that I have provided a very simple but most effective device for initially preventing and later overcoming bridging action of ground materials carried in an inverted container, and while I have described the device in the one particularly simple form, it is obvious that structural changes may be made, particularly in the formation of the lower end of the wire bends, all without departing from the spirit of the invention, and I therefore do not desire to be limited to that precise form beyond the limitations which may be imposed by the following claims.

I claim:

1. The combination with a dry feed container open at its under side and a feed pan receiving feed on its floor from the container and spaced below said side, of a device for agitating feed within the container to overcome bridging, comprising a wire member having a transverse portion freely resting on the pan floor and exceeding the diameter of the container opening, and free leg lengths extending from the ends of said portion, said leg lengths extending upwardly and diagonally crossing each other at a zone within the container to have free ends of those legs disposed in spaced apart relation well up in the container above said zone.

2. The structure of claim 1 in which said transverse portion of said wire member and the slope of said legs allows the plane of the legs to be inclined to present said transverse portion outwardly beyond the extent of said container lower side.

3. The structure of claim 1 in which the spacing apart of said leg free ends is less than the internal diameter of said container.

4. The structure of claim 1 in which said container has a lesser diameter adjacent said under side than throughout its major length, and the spacing apart of said leg free lengths is greater than said lesser diameter and less than the diameter of said major length, and said crossing zone is within said container lesser diameter portion.

References Cited in the file of this patent

FOREIGN PATENTS 16,015     Denmark _____ May 28, 1912